United States Patent
Tomita

(10) Patent No.: US 7,523,865 B2
(45) Date of Patent: Apr. 28, 2009

(54) HIGH RESOLUTION BARCODE AND DOCUMENT INCLUDING VERIFICATION FEATURES

(75) Inventor: Hiroshi Tomita, San Carlos, CA (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 0 days.

(21) Appl. No.: 11/537,563

(22) Filed: Sep. 29, 2006

(65) Prior Publication Data

US 2008/0116277 A1   May 22, 2008

(51) Int. Cl.
G06K 9/18 (2006.01)
G06K 9/36 (2006.01)

(52) U.S. Cl. .................. 235/462.09; 235/462.1; 235/494; 235/487; 235/375; 235/462.011

(58) Field of Classification Search ................. 235/462, 235/462.1, 462.09, 462.15, 494, 487, 375
See application file for complete search history.

(56) References Cited

U.S. PATENT DOCUMENTS

| | | | | |
|---|---|---|---|---|
| 5,243,655 A | * | 9/1993 | Wang | 380/51 |
| 5,490,217 A | * | 2/1996 | Wang et al. | 380/51 |
| 5,506,697 A | * | 4/1996 | Li et al. | 358/448 |
| 5,754,697 A | * | 5/1998 | Fu et al. | 382/232 |
| 5,760,382 A | * | 6/1998 | Li et al. | 235/436 |
| 6,320,982 B1 | * | 11/2001 | Kurzweil et al. | 382/173 |
| 6,382,510 B1 | * | 5/2002 | Ni | 235/462.08 |
| 2004/0202386 A1 | * | 10/2004 | Quine | 382/305 |
| 2006/0034505 A1 | * | 2/2006 | Luk-Pat et al. | 382/144 |
| 2006/0056735 A1 | * | 3/2006 | De Haan | 382/299 |
| 2006/0124744 A1 | * | 6/2006 | Gormish et al. | 235/462.08 |
| 2007/0176000 A1 | * | 8/2007 | Cattrone et al. | 235/462.01 |

* cited by examiner

Primary Examiner—Thien M. Le
Assistant Examiner—Tuyen K Vo
(74) Attorney, Agent, or Firm—Finnegan, Henderson, Farabow, Garrett & Dunner LLP

(57) ABSTRACT

Systems, methods and storage mediums are disclosed for processing images and two-dimensional barcodes for two-way verification of document data. In one exemplary embodiment, image data of a document is obtained, processed and rendered into a barcode for incorporation into a reproduction of an original image of the document. The resolution of the barcode may be higher than the resolution of the original image which allows the size of the barcode to be reduced. Moreover, the amount of data associated with the original image may be decreased which allows for smaller data storage requirements and faster data transfer of the document.

20 Claims, 9 Drawing Sheets

HIGH RESOLUTION BARCODE AND DOCUMENT INCLUDING VERIFICATION FEATURES

BACKGROUND

1. Field of the Invention

The present invention relates to processing a document and associated barcode, and, more particularly, to verification and other image processing features associated with the document and barcode.

2. Description of Related Information

Barcoding is a widely used mechanism for facilitating the accurate and secure storage and communication of information. For example, barcodes are often used in retail environments for representing product identification numbers and prices. Alternatively, barcodes have been used on such objects as personal ID cards, driver's licenses and passports as a way to store alpha-numeric data such as names and dates.

Existing barcode systems are used to associate barcodes with documents such as hardcopy paper documents and electronic documents to facilitate their storage and distribution. Systems for transmitting documents and communicating related information sometimes include components capable of providing documents, such as textual, schematic, diagrammatic, graphical and photographic documents, in a secure manner. However, existing systems do not provide sufficient security mechanisms for allowing comparison between barcode data and original image data. Furthermore, such systems generally do not provide the barcode capacity sufficient to store the amount of information necessary to create a complete reproduction of an original document image Moreover, excessive barcode footprints may obscure or altogether eliminate portions of a document that would otherwise be useable.

Accordingly, there is a need for improved transmission of sensitive documents wherein document image data can be safely stored in an encrypted barcode prior to transmission. Furthermore, there is a need for a system and method of associating barcodes with documents such that the barcodes may encode enough information for subsequent comparison to the original document and associated verification functionality. There is also a need for barcodes with sufficient capacity for a relatively small barcode to create a reproduction of the document.

In sum, there is a need for systems and methods for processing document image data to create a barcode including features that enable improved verification and/or reproduction of the original document, and increase the resolution of the barcode such that it features increased data capacity per unit of barcode area.

SUMMARY

Systems, methods, and articles of manufacture consistent with embodiments of the present invention are directed to processing document image data to produce a barcode, from which the original image may be reproduced, wherein the resolution of the barcode may be higher than the resolution of the original image.

In accordance with one exemplary embodiment, an image data processing system is provided that processes images and two-dimensional barcodes associated with the images. Moreover, the system includes: an image obtaining component that receives an original image or original image data to be processed; a storage component that stores a program of instructions including instructions for generating barcode data for a two-dimensional barcode to be associated with the original image, wherein the two-dimensional barcode encodes a representation of the original image such that the original image can be reproduced from the two-dimensional barcode; a processor that processes the image data; a barcode producing component that produces the two-dimensional barcode based on the original image data; and a document producing component that creates a reproduction of the original image such that the resolution of the two-dimensional barcode associated therewith is higher than the resolution of the original image.

In further embodiments, increased two-dimensional barcode resolution may allow a relatively increased amount of data to be stored in the same size two-dimensional barcode thereby permitting the size of the barcode footprint to be reduced.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the following exemplary embodiments of the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers are used throughout the drawings to refer to the same or like parts.

Systems, methods and articles of manufacture directed to document imaging, barcode creation, and associated data processing are disclosed. Specifically, information based on a document's original image data may be processed to create a barcode for association with the document (e.g., rendering on a reproduction of the document, placement on the original document, etc.). This barcode has high enough resolution that it may be used to reproduce or otherwise verify the original image. In further embodiments of the present invention, the document may be produced such that the resolution of the two-dimensional barcode is higher than the resolution of the original image such that the increased resolution may allow a decrease in the size of the barcode footprint.

In other embodiments of the present invention, an image and data processing system is disclosed that processes images and two-dimensional barcodes associated with the images, wherein the system may include an image obtaining component, a storage component, a processor, a barcode producing component, and a document producing component. In a further embodiment, the document producing component creates a reproduction of the document in combination with the two-dimensional barcode such that the resolution of the two-dimensional barcode may be higher than the resolution of the original image. Accordingly, because the resolution of the two-dimensional barcode may be higher than the resolution of the original image, more information may be stored in the same size two-dimensional barcode thereby permitting the size of the barcode to be reduced. Thus, a barcode according to this embodiment has a smaller footprint, which yields greater usable space on the reproduced document and thus the provision of more information.

Figure 1:
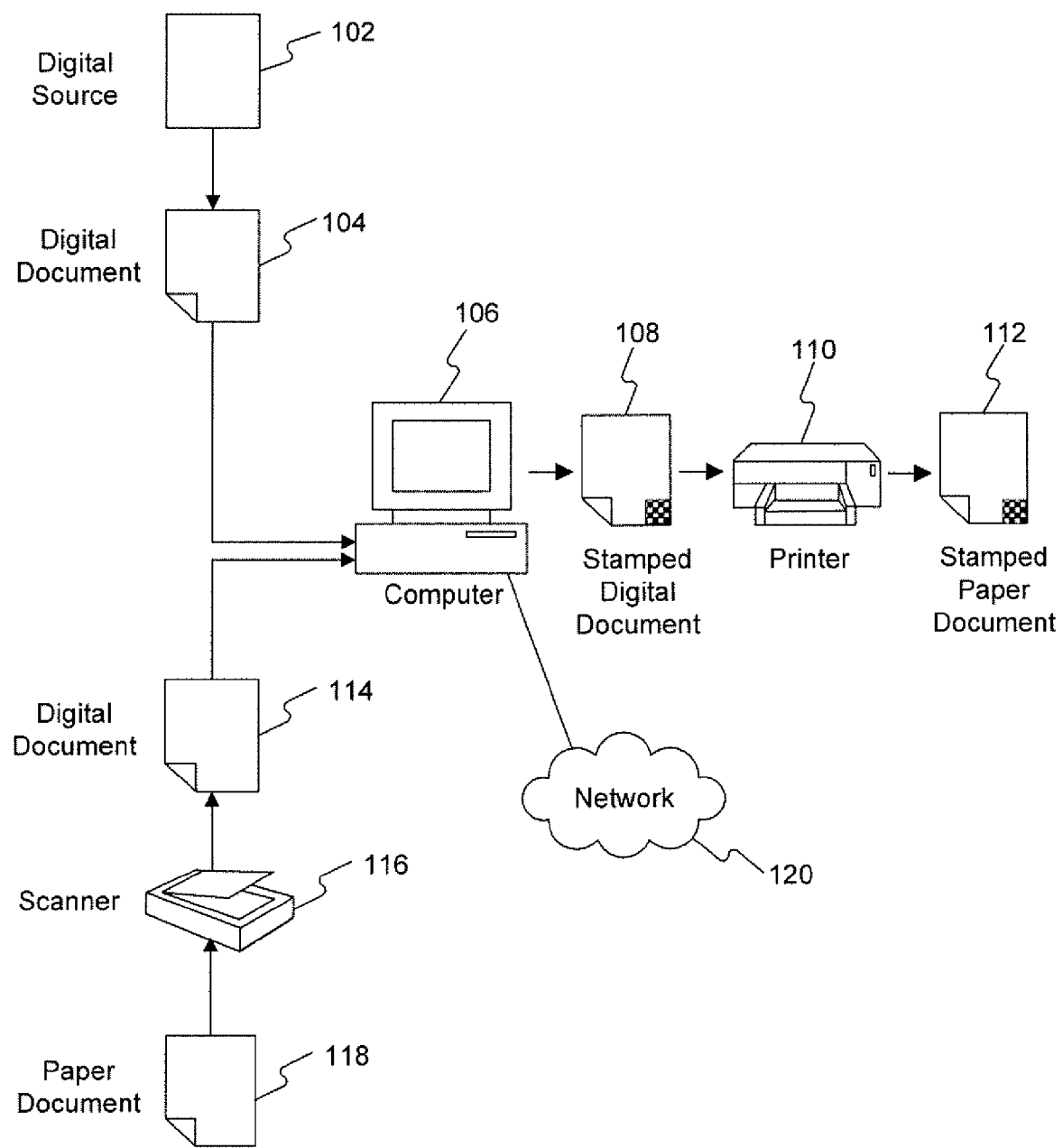
FIG. 1 is a block diagram illustrating embodiments of original image retrieval methods associated with an image data processing system consistent with certain aspects related to the present invention.

Accordingly, it will be appreciated by one of skill in the art that the barcodes illustrated in FIG. 1 and subsequent figures are only exemplary in nature and are not drawn to scale. The sizes of the barcodes in area (i.e., footprint) relative to the sizes of the documents are not meant to be representative of their actual sizes. The actual decrease in barcode area or "footprint" will become apparent to one of skill in the art in view of the resolutions and tile sizes recited herein.

FIG. 1 is a block diagram of an exemplary system 100 illustrating how an image obtaining component of an image data processing system may involve one of several mechanisms for receiving an original image or original image data for processing. In one embodiment, an image obtaining component may be a scanner 116. In this implementation, a hard-copy paper document 118 may be scanned to produce a digital document 114 for transmission to a personal computer 106. Alternatively, an original image may be obtained as digital document 104 from any digital source 102 including, but not limited to, a locally connected media such as a floppy disk, CD-ROM, DVD, USB drive or any other data storage means. In further embodiments, an original image document may be obtained as transmitted from a network 120 such as a telephony-based network, a local area network (LAN), a wide area network (WAN), a wireless network, an intranet, the Internet or any other communication means. Computer 106 may thereby transmit and receive digital communications such as data files including documents to and from remote locations. Specifically, computer 106 may receive digital documents for processing via network 120. Moreover, computer 106 may transmit stamped digital documents after processing via network 120. In one embodiment, a digital image of a document may be received as an attachment to an e-mail. In one or more embodiments, the image obtaining component may also include an internal information receiving element of a computer.

In another exemplary embodiment, an image data processing system may include a scanner, a personal computer 106, a printer, and a network, as shown in FIG. 1. In this implementation, an original image may be obtained by scanner 116 in communication with the personal computer. Specifically, scanner 116 may convert image data from paper document 118 into digital document 114 for transmission to computer 106 for processing. Accordingly, the storage component, processor and barcode producing component of computer 106 may create stamped digital document 108. Stamped digital document 108 may subsequently be printed as stamped paper document 112 by a printer 110 in communication with the personal computer. Here, stamped digital document 108 and stamped paper document 112 may each comprise a reproduction of the original image and an associated barcode from which the original image may be reproduced, wherein the resolution of the barcode is higher than the resolution of the reproduced original image.

In one or more embodiments, computer 106 may include a storage component, a processor, and a barcode producing component. The storage component may store a program of instructions including instructions for generating barcode data for a two-dimensional barcode to be associated with the original image, wherein the two-dimensional barcode encodes a representation of the original image such that the original image may be reproduced from the two-dimensional barcode. The storage component may include any type of memory such as: magnetic storage including floppy disk, hard disk, or magnetic tape; semiconductor storage such as solid state disk (SSD) or flash memory; optical disc storage such as CD-ROM, CD-RW, DVD, DVD-RW, Blu-ray, or HD DVD; magneto-optical disc storage; phase-change memory; or holographic storage. Furthermore, computer 106 may include one or more processors for processing data according to instructions stored in the storage component. The functions of the processor may be provided by a single dedicated processor or by a plurality of processors. Moreover, the processor may include, without limitation, digital signal processor (DSP) hardware, or any other hardware capable of executing software. The barcode producing component may produce a barcode based on the processed original image data, wherein the barcode has high enough resolution to embody the full representation of the original image. Specifically, a sufficient amount of information may be encoded within the barcode such that the original image may be digitally reproduced and/or printed without the need for access to any other stored image data. Accordingly, computer 106 may create stamped digital document 108 which comprises a reproduction of the original image and an associated barcode from which the original image may be reproduced, wherein the resolution of the barcode is higher than the resolution of the reproduced original image.

Figure 2A:
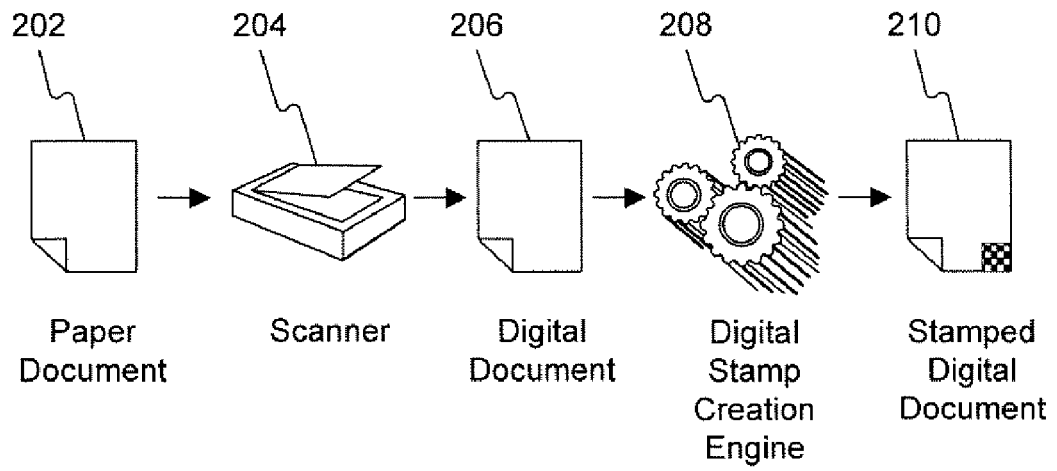
FIG. 2a is a block diagram illustrating an embodiment of a barcode stamping process system consistent with certain aspects related to the present invention.

FIG. 2A is a block diagram illustrating another embodiment of an image data processing system that processes images and two-dimensional barcodes associated with the images. In this implementation, the system may include an image obtaining component 204 and a digital stamp creation engine 208. In this particular embodiment, image obtaining component 204 is a scanner which may receive an original image or original image data by scanning paper document 202. Scanner 204 may thereby produce digital document 206 for processing by digital stamp creation engine 208. In one embodiment, digital stamp creation engine 208 may include a storage component, a processor and barcode producing component. Accordingly, digital stamp creation engine 208 may convert digital document 206 into stamped digital document 210 wherein the document may be produced such that the resolution of the two-dimensional barcode is higher than the resolution of the original image.

The storage component of digital stamp creation engine 208 may store a program of instructions for generating barcode data for a two-dimensional barcode to be associated with the original image, wherein the two-dimensional barcode encodes a representation of the original image such that the original image can be reproduced from the two-dimensional barcode. The processor of digital stamp creation engine 208 may process data according to instructions in the storage component. The barcode producing component of digital stamp creation engine 208 may produce the two-dimensional barcode from which the original image may be produced. Accordingly, digital stamp creation engine 208 may produce stamped digital document 210 which may include a reproduction of the original image and the two-dimensional barcode such that the resolution of the two-dimensional barcode is higher than the resolution of the original image.

Figure 2B:
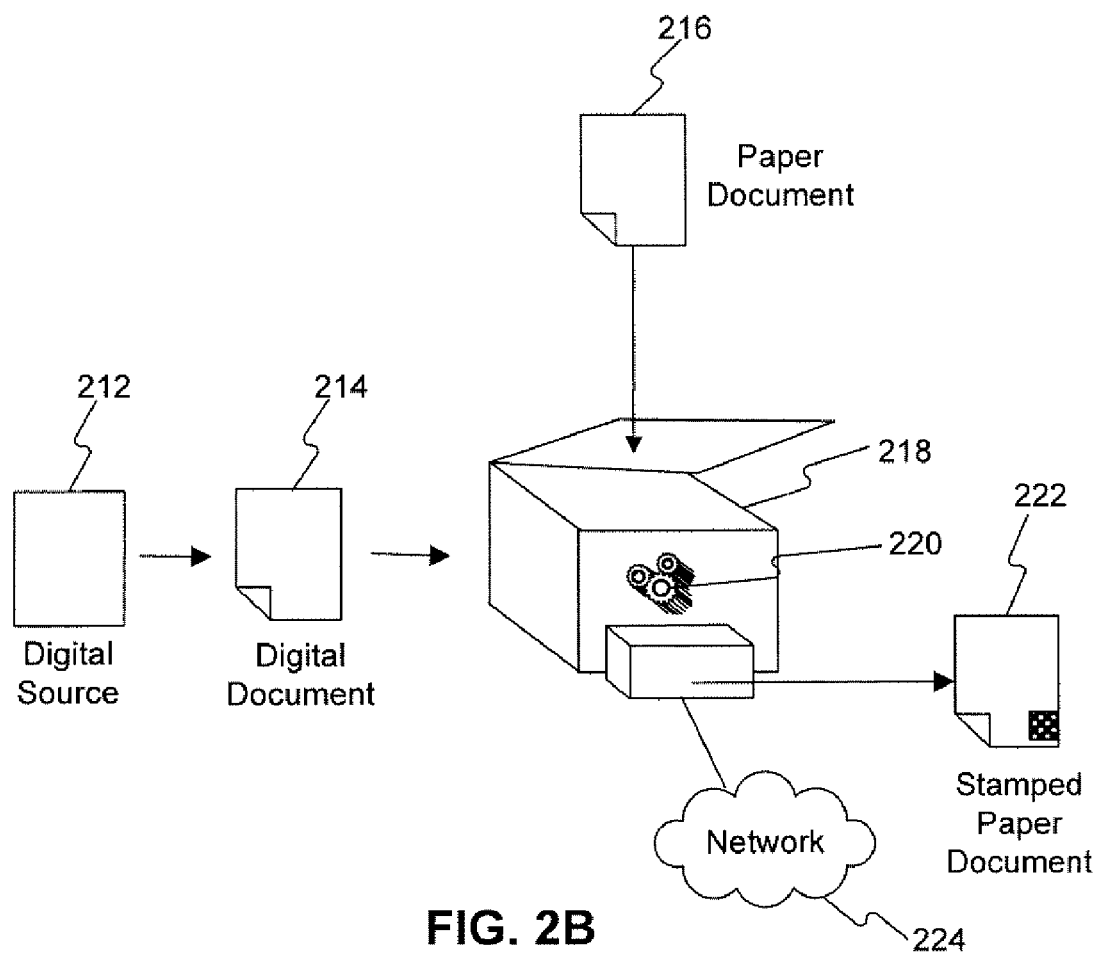
FIG. 2b is a block diagram illustrating an embodiment of a multi-function device type image processing system consistent with certain aspects related to the present invention.

FIG. 2B is a block diagram illustrating an exemplary image data processing system that may include a multi-function type device 218 (commonly known as "all-in-one" systems) and a network 224. Device 218 may include printing, fax and scanning capabilities, and may range from a small, consumer-type model, to a large, commercial or office-type device. In one embodiment, device 218 may include an image obtaining component, a built-in digital stamp creation engine 220 and a document producing component.

Network 224 may allow device 218 to communicate transmission or receipt of documents to and from remote locations via a telephony-based network, a local area network (LAN), a wide area network (WAN), a wireless network, an intranet, the Internet or any other communication means. Digital source 212 may include any locally connected media such as a floppy disk, CD-ROM, DVD, USB drive or any other data storage means. Accordingly, device 218 may obtain an original image either by scanning a paper document 216, by receiving a digital document 214 electronically from digital source 212 or by transmission from network 224. Moreover, device 218 may produce a document by either printing a stamped paper document 222 or by creating a stamped digital document for electronic transmission across network 224.

Digital stamp creation engine 220 may include a storage component, a processor, and a barcode producing component. The storage component of digital stamp creation engine 220 may store a program of instructions for generating barcode data for a two-dimensional barcode to be associated with the original image, wherein the two-dimensional barcode encodes a representation of the original image such that the original image can be reproduced from the two-dimensional barcode. The processor of digital stamp creation engine 220 may process data according to instructions in the storage component. The barcode producing component of digital stamp creation engine 220 may produce the two-dimensional barcode from which the original image may be produced. Accordingly, digital stamp creation engine 220 may produce a stamped document which may include a reproduction of the original image and the two-dimensional barcode such that the resolution of the two-dimensional barcode is higher than the resolution of the original image. Because the resolution of the two-dimensional barcode may be higher than the resolution of the original image, more information may be stored in the same size two-dimensional barcode thereby permitting the size of the barcode to be reduced (i.e., to create a smaller footprint).

In further embodiments of the present invention, storage mediums are disclosed that store computer-readable programs of instructions for processing images and two-dimensional barcodes associated with the images. In this implementation, the programs of instructions may include instructions that instruct a processor to execute the steps of: obtaining an original image; processing the original image into encoded data; and rendering the encoded data into a two-dimensional barcode for association with the document (e.g., rendering on a reproduction of the document, placement on the original document, etc.). In still further embodiments of the present invention, the computer-readable programs may include: a code for a receiving step of receiving an original image; a code for a filtering step of filtering out noise and undesirable features from the original image; a code for a partitioning step of partitioning the original image into smaller cells; a code for an extracting step of extracting features from each of the cells to provide cell data; a code for a compressing step of compressing the cell data from each cell to yield compressed data; a code for a manipulating step of manipulating the compressed data to produce encoded data; and a code for a rendering step of rendering the encoded data into a two-dimensional barcode for association with the document (e.g., rendering on a reproduction of the document, placement on the original document, etc.).

The above computer-readable programs and codes may be embodied in any form of tangible media storage such as: magnetic storage including floppy disk, hard disk, or magnetic tape; semiconductor storage such as solid state disk (SSD) or flash memory (e.g., USB drive); optical disc storage such as CD-ROM, CD-RW, DVD, DVD-RW, Blu-ray, or HD-DVD; magneto-optical disc storage; phase-change memory; or holographic floppy disk or any other machine readable storage medium. In particular, when the above programs and/or codes are implemented into and executed by a computer, either by the above storage mediums or over a network such as a telephony-based network, a local area network (LAN), a wide area network (WAN), a wireless network, an intranet, the Internet or any other communication means, the computer becomes an apparatus and/or part of system for practicing the invention. That is, the programs and code, when embodied in or integrated with a processor, function to create a machine or apparatus having a unique structure of circuitry.

In a further embodiment of the present invention, a method of processing images and two-dimensional barcodes associated with the images is also disclosed. The method may include obtaining an original image; processing the original image into encoded data; and rendering the encoded data into a two-dimensional barcode for association with the document (e.g., rendering on a reproduction of the original image, placement on the original document, etc.) such that the resolution of the two-dimensional barcode is higher than the resolution of the original image. Accordingly, because the resolution of the two-dimensional barcode may be higher than the resolution of the original image, more information may be stored in the same size two-dimensional barcode thereby permitting the size of the barcode to be reduced (i.e., to create a smaller footprint).

Specifically, in a further embodiment, a barcode of 5 pixels by 5 pixels at 300 DPI, wherein the tile size is 400 μm×400 μm and a pixel is 80 μm across, may be increased in resolution to 600 DPI. In this implementation, the higher resolution barcode may have a smaller area (i.e., footprint) with tile size of 200 μm×200 μm because each pixel is now 40 μm across. Because this higher resolution stores more data per unit of area, the barcode of reduced area may provide substantially equivalent or increased capacity.

In a further embodiment, the system may involve a method for processing the high resolution barcode and determining compatibility with hardware such as printers and scanners. For example, the high resolution two-dimensional barcode may include a barcode header which contains information about resolution quanta and particulars (e.g., DPI, tile size, pixel size, printer requirements, scanner requirements, etc.). Accordingly, when an instruction to print a document including a high resolution barcode is issued, the system software, upon processing of the barcode header, may perform a local and/or network search for available printers having sufficient output resolution for reproduction of the high resolution barcode. Alternatively, when an instruction to scan a document including a high resolution barcode is issued, the system software may similarly search for scanners having sufficient resolution and/or determine whether or not a particular scanner is capable of capturing the high resolution data contained in the barcode. In this implementation, a user may be notified via a user interface such as a computer, scanner, or multi-function device of the discrepancy. For example, the user may be notified that the scanner does not possess the capability to scan the barcode with sufficient accuracy, that use of the scanner may involve information loss, etc.

Figure 3:
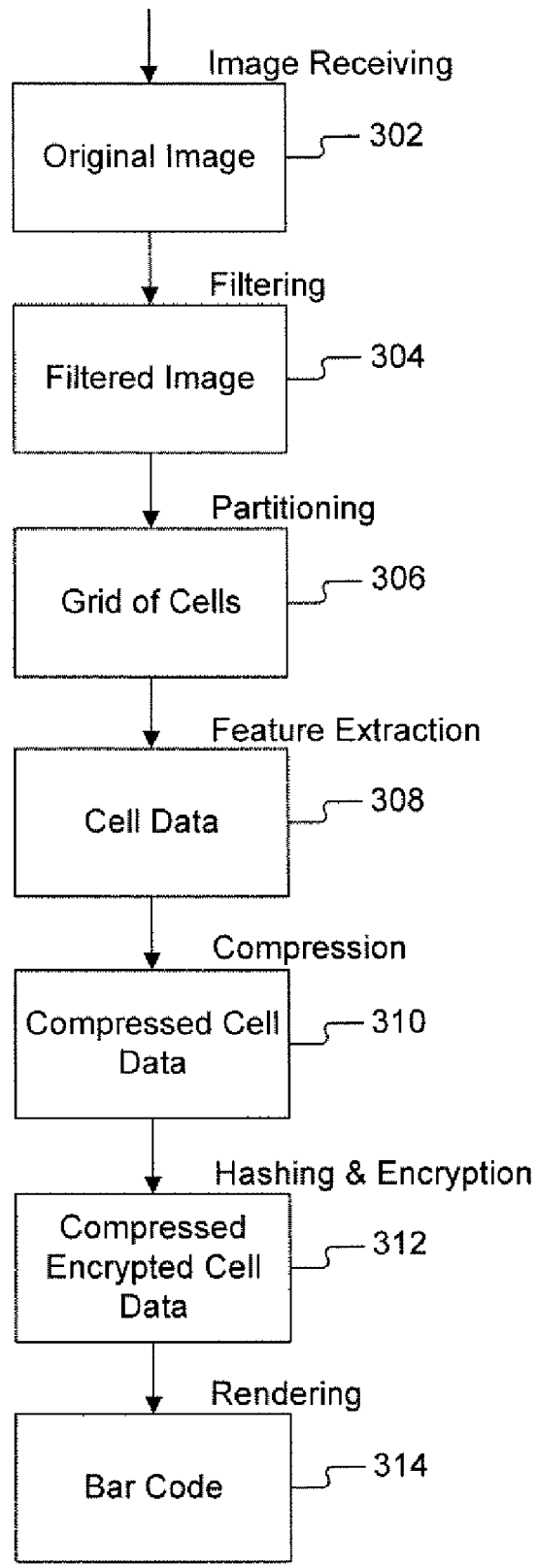
FIG. 3 is a flowchart illustrating an embodiment of image processing steps system consistent with certain aspects related to the present invention.

FIG. 3 is a flowchart illustrating exemplary processing steps for processing image data of documents and associated barcodes. An original image 302 may first be received by one of several methods. In one embodiment, an original image is obtained via a scanner. In this implementation, a hardcopy paper may be scanned into a digital image format for transmission to a personal computer. Alternatively, an original image may be obtained as a digital image of a document as transmitted over a network such as a telephony-based network, a local area network (LAN), a wide area network (WAN), a wireless network, an intranet, the Internet or any other communication means. In a further embodiment, a digital image of a document is received as an attachment to an email. An original image may also be obtained from locally connected media such as a floppy disk, CD-ROM, DVD, USB drive or any other data storage means.

Once an original image of a document has been received in digital format, the image may be filtered. Specifically, in a primarily textual file, font information may be distinguished from non-font information (e.g., dirt, spot etc.). In this implementation, non-font information may be deleted from the original digital document. In a further embodiment, a document containing photographic or graphical images may undergo photographic processing steps such as alterations to sharpness, brightness, contrast, tone, color or any other steps common to digital photo processing. Various features of an image may be removed, edited, thickened, thinned, separated etc. as desired until the filtered image 304 is produced.

Subsequently, the filtered image 304 may be partitioned into smaller areas for feature extraction. In one exemplary embodiment, the original image may be a 300 dpi (Dot Per Inch) scan of a Letter size sheet (8.5 inches×11 inches). This results in an image size of 3300×2550 pixels. During the partitioning step, the image may be divided into a grid of cells 306 varying in cell size depending on the capacity of the two-dimensional barcode stamp to be used and depending on the user's desired threshold of tamper detection. In one exemplary embodiment, a digital document is divided into a grid of 150×150 cells. Each cell therein is 22×17 pixels. In further embodiments, the document image may be divided into a grid of 32×32 cells, 64×64 cells, 128×128 cells, 150×150 cells, 256×256 cells, etc., depending upon desired resolution.

After partitioning, each cell may undergo a feature extraction step so as to retrieve cell data 308. According to one embodiment, objects in each cell may be defined by an algorithm such as FFT, DCT, Area, Perimeter or Angles etc. Some content-based feature from each cell may be required in order to uniquely define the content of each cell. These features may be selected based on several methods as long as they can provide a unique definition of the content of the cell not easily produced by a different cell in the grid. In further embodiments, objects in each grid may simply be defined by bitmap or other Raster representation.

Each set of extracted cell data 308 may then be compressed and encoded. According to certain embodiments, due to size limitation of the two-dimensional barcode stamp, the compressed feature data 310 may require hashing such that it occupies a single byte. In one exemplary embodiment, the size of the stamp may be approximately 3600 bits (i.e., 450 bytes). Each set of extracted cell data may be compressed and hashed into 1 byte by a Hash Function. In a 150×150 grid there are 374 blocks, each of 1 byte, which fits the capacity of a 450 byte stamp thus allowing for additional data for Error correction etc. In this implementation, the 374 bytes of compressed data may be RSA encrypted with a pubic key prior to embedding in order to resist reverse engineering. After the document image data has been compressed and encrypted, the compressed and encrypted cell data 312 may be passed to a barcode renderer which renders barcode 314 for association with the original image or reproduction of the original image.

It will be apparent to those skilled in the art that many different processing methods may be suitable for implementing the functionality of the above processing steps. Specifically, the particular above-referenced steps along with the flowchart of FIG. 3 are merely one exemplary embodiment of the myriad available processing steps applicable to the present principles and within the scope of the present invention. That is, alternative steps and sequences in the process of encoding and decoding between original document image data and barcode data are applicable to and consistent with the present system and method for generating a barcode, from which an original image may be reproduced, wherein the resolution of the two-dimensional barcode is higher than the resolution of the original image.

Figure 4:
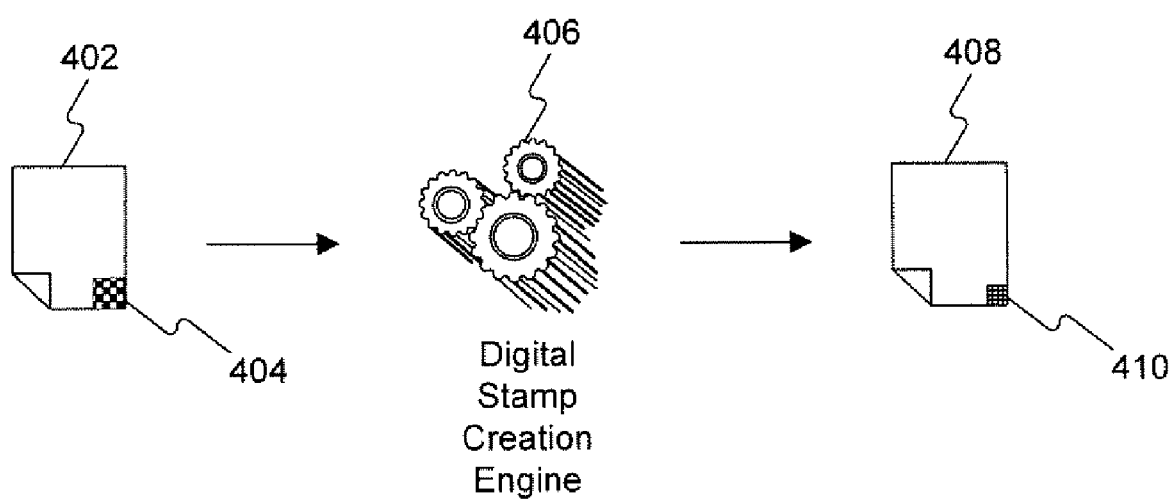
FIG. 4 is a block diagram illustrating an embodiment of stamp processing and creation consistent with certain aspects related to the present invention.

FIG. 4 illustrates an embodiment of the present invention of processing original image or barcode data from a stamped document 402 including an original image and a standard barcode 404. In this embodiment document 402 may undergo processing by digital stamp creation engine 406 so as to become document 408 having a high resolution two-dimensional barcode 410, from which the original image may be reproduced, wherein the size of the high resolution barcode may be reduced such that barcode 410 has a smaller footprint than barcode 404. Specifically, the two dimensional barcode itself may have a higher resolution (e.g., 600 dpi) than the original image (e.g., 300 dpi) such that the footprint of the two dimensional bar code may be smaller than it would be had the barcode been rendered in the same in resolution as the original image. In a further embodiment, the original image data may have been obtained from a digital file received from a computer or a remote source. In this implementation, digital stamp creation engine may create a high resolution two-dimensional barcode for association with the digital document consistent with the systems and methods disclosed above such that the barcode of the digital document has a higher resolution than the original image of the digital document itself.

Figure 5:
FIG. 5 is a diagrammatic representation of a black and white barcode system consistent with certain aspects related to the present invention.
Figure 6:
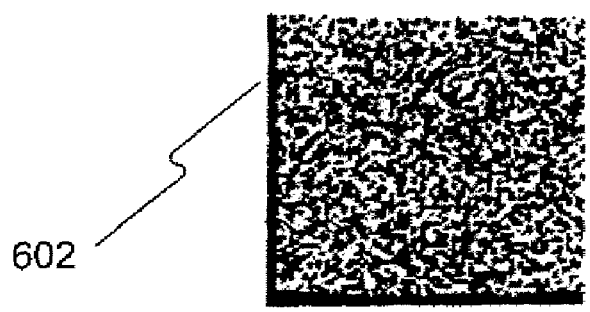
FIG. 6 is a diagrammatic representation of an 8-Bit grayscale barcode system consistent with certain aspects related to the present invention.
Figure 7:
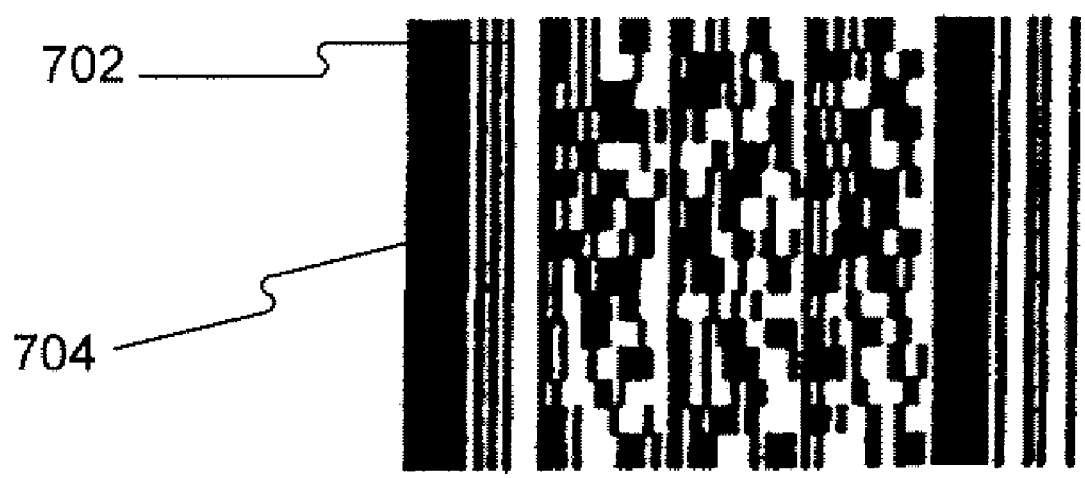
FIG. 7 is a diagrammatic representation of a PDF417 barcode system consistent with certain aspects related to the present invention.
Figure 8:
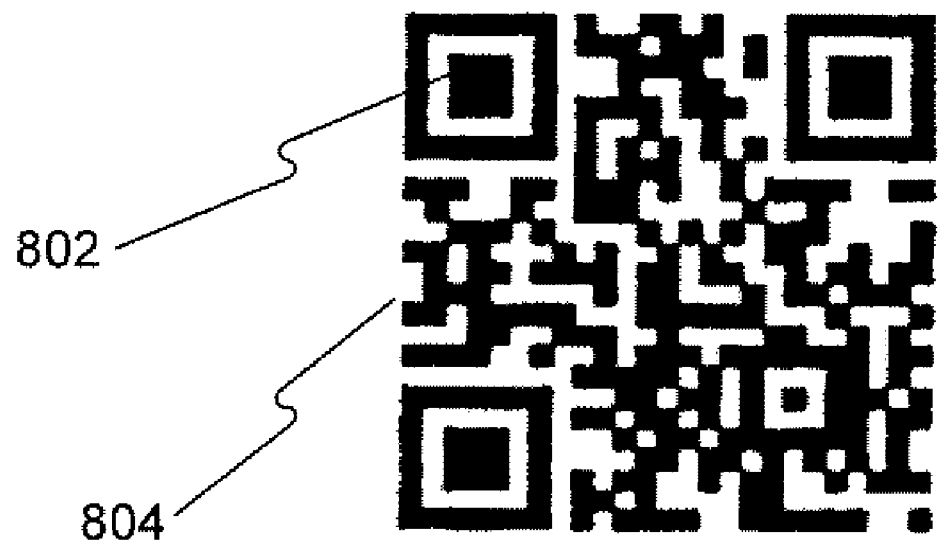
FIG. 8 is a diagrammatic representation of a QRCODE barcode system consistent with certain aspects related to the present invention.

Various two-dimensional barcodes may be incorporated in and are contemplated for use in the present invention. Many prior-art references have detailed the myriad types of barcodes, most of which are applicable to the methods and systems. For example, U.S. Pat. No. 5,490,217 discloses a high capacity two-dimensional barcode for association with a document. U.S. Pat. No. 5,513,264 discloses one-dimensional codes such as UPC, Code 39, and Code 128; two-dimensional barcodes such as PDF417, Code 49 and Code 16K; matrix codes such as Data Code, Code 1, Vericode and MaxiCode; and graphic codes such as Glyphs. U.S. Pat. No. 6,565,003 discloses a two-dimensional barcode having a 20×20 array of data bits. U.S. Pat. No. 6,753,977 discloses a document barcode that is imperceptible to the human eye. Several particular barcodes are disclosed herein, however, merely for the purposes of example. In one embodiment of the present invention, the rendered barcode is a rectangular, two-dimensional barcode. Specifically, FIG. 5 illustrates one type of black & white bar code having a tile size of 5×5 pixels, wherein the maximum digital only data capacity is 90,000 bits and the maximum closed loop data capacity is 3,600 bits. This size of this barcode may allow for effective reading, printing and scanning. FIG. 6 illustrates an 8 Bit grayscale barcode having a tile size of 1×1 pixels, wherein the maximum digital only data capacity is 720,000 bits and the maximum closed loop data capacity is 28,800 bits. Comparatively, this barcode may have lower printing and scanning effectiveness. Higher capacity barcodes such as the PDF417 shown in FIG. 7 and the QRCODE shown in FIG. 8 may also be applicable to the present disclosure.

It will be apparent to those skilled in the art that many different barcodes may be suitable for implementing the functionality of the present systems and methods as described above. The barcodes listed are intended to be merely exemplary and not limiting in any way. Furthermore, applicable barcodes are intended to encompass both structural and functional equivalents of those listed. Additionally, it is intended that such equivalents include both currently known barcode equivalents as well as any equivalents developed in the future.

Figure 9:
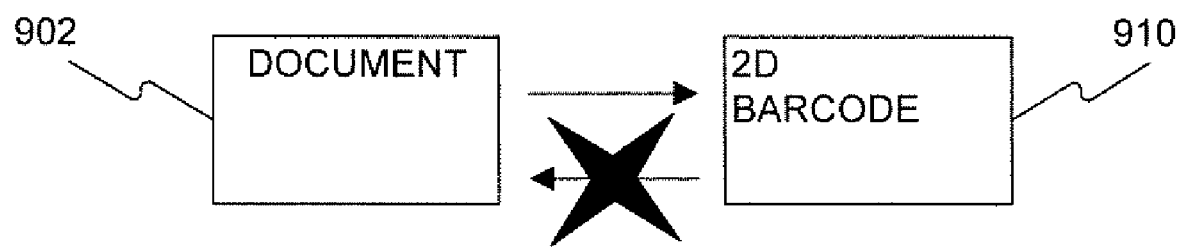
FIG. 9 is a block diagram illustrating one-way barcode creation system consistent with certain aspects related to the present invention.
Figure 10:
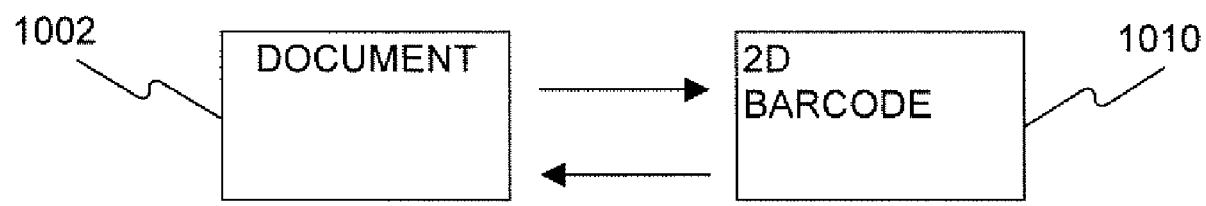
FIG. 10 is a block diagram illustrating an embodiment of two-way barcode to document verification system consistent with certain aspects related to the present invention.

According to further embodiments of the present invention, the image data processing system and its method of use may involve two-way verification or authentication between the contents of an original image and the barcode associated with it. Previous systems and methods as shown in FIG. 9 lacking this advantageous feature involve only one-way flow of data. After document image data from document 902 has been rendered as a barcode 910, there is no assurance that the document retains the same information as stored in the barcode. Alternatively, FIG. 10 illustrates a block diagram of an exemplary embodiment of the present invention wherein document and barcode data may be compared to determine whether or not the barcode accurately represents the content of the document. This may be particularly helpful for indicating whether or not a document has been tampered with or otherwise edited after the barcode has been rendered and affixed thereto. Particularly, image data from 1002 may be rendered as barcode 1010 according to systems and methods as described above. Advantageously, barcode 1010 may be subsequently decoded for comparison to the contents of document 1002. Comparison between the two sets of information may occur at various increments along the spectrum between document and barcode. For example, barcode 1010 may be decoded and reproduced as a document image for subsequent optical scan and comparison between the two document images. Alternatively, document 1002 may be encoded and rendered as a barcode for subsequent optical scan and comparison between the two barcodes. In further embodiments, document 1002 undergoes at least a portion of the processing necessary to produce the binary data used for rendering an associated barcode. Barcode 1010 may undergo at least a portion of the decoding necessary to produce the binary data used for reconstructing an image. According to a further embodiment, the contents of barcode 1010 and the contents of document 1002 are compared as two sets of alphanumeric data for the purpose of determining whether or not barcode 1010 represents the actual condition of document 1002.

Figure 11:
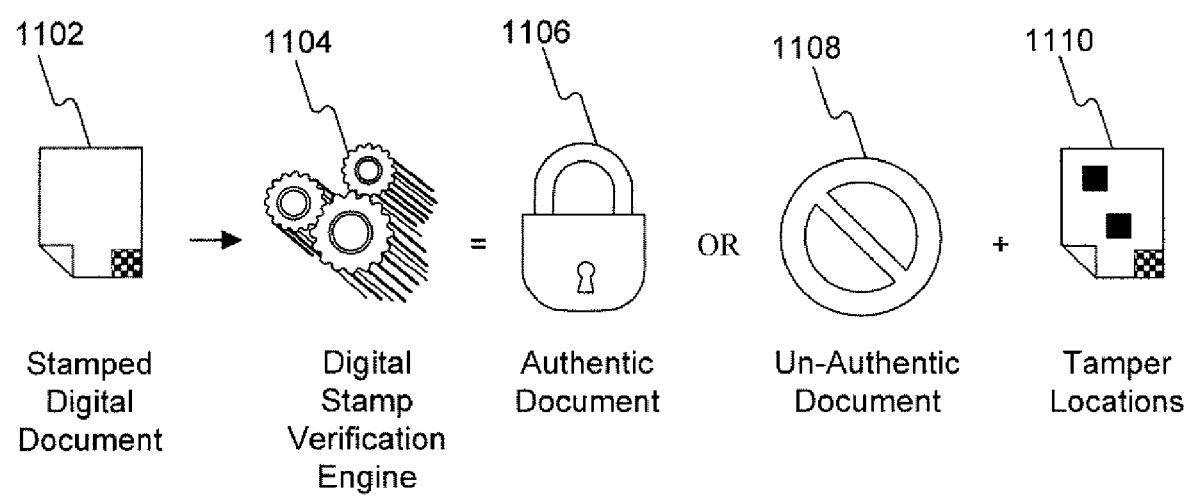
FIG. 11 is a block diagram illustrating an embodiment including document verification with tamper notification system consistent with certain aspects related to the present invention.

In a further embodiment, as illustrated in FIG. 11, two-way verification between the document and barcode may be manifested to a user in a tangible form such as by indication of tamper locations on the document. In this embodiment, stamped digital document 1102 may undergo processing by digital stamp verification engine 1104. Digital stamp verification engine 1104 may include an image obtaining component, a storage component, a processor, a barcode producing component and an authenticated/unauthenticated document producing component. The image obtaining component may receive information from the image of a digital document as well as from the barcode associated with the document. The storage component may store a program of instructions for comparing barcode data of the two-dimensional barcode and image data of the digital document. The processor may process data according to instructions in the storage component. The document producing component may produce a document including a reproduction of the original document indicating results of the comparison by the digital stamp verification engine. Accordingly, the image data processing system will output either indication of an authentic document 1106 or indication of an unauthentic document 1108 in addition to indication on the document of the inconsistent tamper locations 1110.

Figure 12:
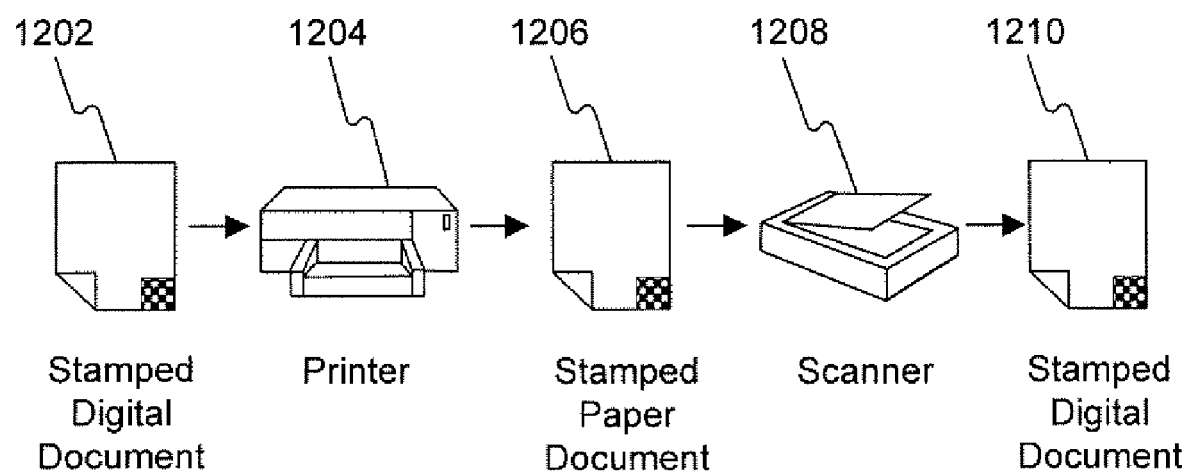
FIG. 12 is a block diagram illustrating closed-loop barcode to document verification system consistent with certain aspects related to the present invention.

FIG. 12 illustrates the versatility of a closed loop system according to an exemplary embodiment of the present disclosure. This exemplary closed loop system, may include printer 1204 and scanner 1208 having resolution capabilities of 600 dpi and 300 dpi, respectively, wherein an original image (not shown in this figure) initially having 300 dpi may be image data scanned by scanner 1208. Furthermore, in one exemplary embodiment of the closed loop system of FIG. 12, the two-dimensional barcode may have tiles of 4×4 pixels, of which tile size is 150 tpi (Tile Per Inch) when recorded in 600 dpi. Specifically, stamped digital document 1202, which may have been prepared from the original image of 300 dpi and may include a reproduced original image of 150 dpi and a two-dimensional barcode of 150 tpi, may be converted into stamped paper document 1206 by printer 1204 or another document producing component having resolution capability equal to or higher than 600 dpi. When stamped paper document 1206 is produced by printer 1204 at 600 dpi, the original image at 300 dpi may be reproduced such that the pixels of the original image are simply doubled in number in vertical and horizontal directions. Stamped paper document 1206 may be physically transported anywhere in the world or stored for any period of time. As desired by the user, image data of stamped paper document 1206 may be subsequently obtained by scanner 1208 or another document obtaining component having a resolution capability equal to or higher than 300 dpi in order to produce stamped digital document 1210. While the reproduced original image on the stamped paper document 1206 has been printed by a printer at 600 dpi, the image itself may have only 300 dpi information therein; therefore, scanner 1208 may read substantially all of the information of the reproduced original image. Similarly, the two-dimensional barcode on the stamped paper document, which may be printed in higher resolution (600 dpi) than the resolution capability of scanner 1208 (300 dpi), may be properly read by scanner 1208 because the barcode has tile size of 150 tpi, which is lower than the resolution capability of scanner 1208. Accordingly, stamped digital document 1210 may be analyzed for comparison between the barcode and document contents, as well as, for comparison to previous stamped digital document 1202 consistent with the systems and methods as described above.

It should be noted that the foregoing embodiments merely illustrate the various principles of the present invention. Those skilled in the art will therefore be able to formulate variations of the foregoing embodiments which are not explicitly disclosed herein, but which are within the scope of the present principles. Moreover, those embodiments and examples disclosed herein along with any statements, conditional language or recitations are intended to be only for purposes of aiding the reader in understanding those principles. It is further intended that the scope of the embodiments and examples herein include structural and functional equivalents including both those currently known, and those developed in the future.

Accordingly, it will further be appreciated by those skilled in the art that the diagrams, flowcharts, and block diagrams illustrated herein are merely intended to assist the reader in understanding certain embodiments of the concepts and principles contemplated by the present invention. Other embodiments of the invention will be apparent to those skilled in the art from consideration of the specification and practice of the invention disclosed herein. It is intended that the true scope and spirit of the present invention be indicated by the following claims.

What is claimed is:

1. An image data processing system configured to process image data and two-dimensional barcodes associated with the image data, the system comprising:
    an image obtaining component that receives original image data of an original image at a first resolution;
    a storage component that stores a program of instructions including instructions for generating barcode data for a two-dimensional barcode that encodes a representation of the original image, such that the original image is reproducible at the first resolution from the two-dimensional barcode;
    a processor that processes the original image data based on the program of instructions;
    a barcode producing component that produces the two-dimensional barcode at a second resolution based on the barcode data of the original image at the first resolution; and
    a document producing component that generates a document having the original image at the first resolution, and the two-dimensional barcode at the second resolution, such that the second resolution of the two-dimensional barcode is higher than the first resolution of the original image.

2. The image data processing system of claim 1 wherein the storage component, processor, and barcode producing component are associated with a personal computer, and wherein the system further comprises:
    a scanner in communication with the personal computer and configured to obtain the original image data; and
    a printer in communication with the personal computer and configured to print the document including the two-dimensional barcode at the second resolution and the original image at the first resolution.

3. The image data processing system of claim 1 wherein the size of the two-dimensional barcode is decreased as a result of the second resolution being higher than the first resolution, via incorporation of higher data storage density processing of the barcode data.

4. The image data processing system of claim 3 wherein the original image is obtained by scanning a hardcopy paper document.

5. The image data processing system of claim 3 wherein the original image is obtained by receiving digital data of the image.

6. An image data processing system configured to process image data and two-dimensional barcodes associated with the image data, the system comprising:
    a scanner that receives original image data of an original image at a first resolution;
    a personal computer comprising:
        a storage component that stores a program of instructions including instructions for generating barcode data for a two-dimensional barcode that encodes a representation of the original image, such that the original image is reproducible at the first resolution from the two-dimensional barcode;
        a processor that processes the original image data based on the program of instructions; and
        a barcode producing component that produces the two-dimensional barcode at a second resolution based on the barcode data of the original image at the first resolution; and
    a document producing component that generates a document having the original image at the first resolution, and the two-dimensional barcode at the second resolution, such that the second resolution of the two-dimensional barcode is higher than the first resolution of the original image.

7. A method of processing images and two-dimensional barcodes associated with the images, the method comprising:
    obtaining an original image at a first resolution;
    processing the original image into encoded data;
    rendering the encoded data into a printable two-dimensional barcode at a second resolution; and
    generating a document having the original image at the first resolution, and the two-dimensional barcode at the second resolution, such that the second resolution of the barcode is higher than the first resolution of the original image.

8. The method of claim 7 wherein the size of the two-dimensional barcode is decreased as a result of the second resolution being higher than the first resolution via higher data storage density.

9. The method of claim 7 wherein the second resolution of the two-dimensional barcode is sufficiently high that the original image at the first resolution may be fully-reproduced even when only the two-dimensional barcode is transferred.

10. The method of claim 7 wherein the step of processing the original image comprises:
   filtering out noise and undesirable features from the original image;
   partitioning the image into a grid of cells;
   extracting features from each of the cells to provide cell data;
   compressing the cell data from each cell to yield compressed cell data; and
   manipulating the compressed data to produce encoded data.

11. The method of claim 10 wherein the original image is obtained by scanning a hardcopy paper document.

12. The method of claim 10 wherein the original image is obtained by receiving digital data of the image.

13. A storage medium that stores computer-readable programs of instructions, the programs of instructions including instructions that instruct a processor to execute the steps of:
   obtaining an original image at a first resolution;
   processing the original image into encoded data;
   rendering the encoded data into a printable two-dimensional barcode at a second resolution; and
   generating a document having the original image at the first resolution and the two-dimensional barcode at the second resolution, such that the second resolution of the barcode is higher than the first resolution of the original image.

14. The storage medium of claim 13 wherein the size of the two-dimensional barcode is decreased as a result of the second resolution being higher than the first resolution via higher data storage density.

15. The storage medium of claim 13 wherein the second resolution of the two-dimensional barcode is sufficiently high that the original image at the first resolution may be fully-reproduced even when only the two-dimensional barcode is transferred.

16. The storage medium of claim 13 wherein the step of processing the original image comprises:
   filtering out noise and undesirable features from the original image;
   partitioning the image into a grid of cells;
   extracting features from each of the cells to provide cell data;
   compressing the cell data from each cell to yield compressed cell data; and
   manipulating the compressed data to produce encoded data.

17. The storage medium of claim 16 wherein the original image is obtained by scanning a hardcopy paper document.

18. The storage medium of claim 16 wherein the original image is obtained by receiving digital data of the image.

19. A storage medium storing a control program that processes images and two-dimensional barcodes associated with the images, the control program comprising:
   a code for a receiving step of receiving an original image at a first resolution;
   a code for a filtering step of filtering out noise and undesirable features from the original image;
   a code for a partitioning step of partitioning the original image into smaller cells;
   a code for an extracting step of extracting features from each of the cells to provide cell data;
   a code for a compressing step of compressing the cell data from each cell to yield compressed data;
   a code for a manipulating step of manipulating the compressed data to produce encoded data;
   a code for a rendering step of rendering the encoded data into a printable two-dimensional barcode at a second resolution; and
   a code for a generating step of generating a document having the original image at the first resolution and the two-dimensional barcode at the second resolution, such that the second resolution of the barcode is higher than the first resolution of the original image.

20. An image data processing system comprising:
   means for obtaining original image data of an original image at a first resolution;
   means for storing a program of instructions including instructions for generating barcode data for a two-dimensional barcode that encodes a representation of the original image, such that the original image is reproducible at the first resolution from the two-dimensional barcode;
   means for processing the original image data based on the program of instructions;
   means for producing a two-dimensional barcode at a second resolution based on the barcode data of the original image at the first resolution; and
   means for generating a document including the original image at the first resolution and the two-dimensional barcode at the second resolution, such that the second resolution of the associated two-dimensional barcode is higher than the first resolution of the original image.

* * * * *